(12) United States Patent
Yamada

(10) Patent No.: US 7,180,948 B2
(45) Date of Patent: Feb. 20, 2007

(54) IMAGE DECODER AND IMAGE DECODING METHOD HAVING A FRAME MODE BASIS AND A FIELD MODE BASIS

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 502 days.

(21) Appl. No.: 10/115,139

(22) Filed: Apr. 4, 2002

(65) Prior Publication Data

US 2002/0172278 A1    Nov. 21, 2002

(30) Foreign Application Priority Data

Apr. 5, 2001    (JP)    ............................ 2001-107329

(51) Int. Cl.
*H04N 7/12*    (2006.01)
(52) U.S. Cl. ................................. 375/240.25
(58) Field of Classification Search ........... 375/240.01, 375/240.12, 240.18, 240.2, 240.21, 240.24, 375/240.25, 240.26; 382/232, 233, 246, 382/250; *H04N 7/12*
See application file for complete search history.

(56) References Cited

U.S. PATENT DOCUMENTS

| 6,665,344 | B1 * | 12/2003 | Fimoff | ...................... 375/240.2 |
| 2004/0218671 | A1 * | 11/2004 | Haraguchi et al. | ..... 375/240.12 |

FOREIGN PATENT DOCUMENTS

| JP | 10-191338 | 7/1998 |
| JP | 2000-59793 | 2/2000 |
| JP | 2000-175195 | 6/2000 |
| JP | 2000-244917 | 9/2000 |
| JP | 2000-350207 | 12/2000 |

OTHER PUBLICATIONS

Riley, Martyn J. et al, "Digital Video Communications", 1997, Artech House Inc., pp. 22-24.*
Masahiro Iwabashi et al., "A Drift Free Scalable Decoder", Technical Report of IEICE, CS94-186, DSP94-108, Jan. 1995, pp. 63-70.

* cited by examiner

*Primary Examiner*—Young Lee
(74) *Attorney, Agent, or Firm*—McGinn IP Law Group, PLLC

(57) ABSTRACT

An image decoder which applies a decoding process to image data includes a module for applying a variable length decoding process to a first image data, a module for applying an inverse quantizing process to the first image data, a module for determining a mode of discrete cosine transform of the first image data, and inverse discrete cosine transform module for obtaining a second image. The inverse discrete cosine transform module transforms the first image data into the second image having a lower degree than the first image data when the mode is a field mode, which performs the discrete cosine transform by each field, using a first basis. The inverse discrete cosine transform module transforms the first image data into the second image with keeping field information when the mode is a frame mode which performs the discrete cosine transform by each frame, using a second basis. A number of calculations included in the inverse discrete cosine transform using the second basis function is substantially equal to a number of calculations included in the inverse discrete cosine transform using the first basis.

4 Claims, 4 Drawing Sheets

IMAGE DECODER AND IMAGE DECODING METHOD HAVING A FRAME MODE BASIS AND A FIELD MODE BASIS

BACKGROUND OF THE INVENTION

1. Field of the Invention

The present invention relates to an image decoder and an image decoding method for obtaining image data whose size is reduced, from image data which has been compression-coded.

2. Description of the Related Art

When reproducing image data which has been compressed in a compression method which supports interlaced scanning such as MPEG 2 (Moving Pictures Experts Group phase 2), etc., there are some cases where such image data is displayed on a display device having resolution different from the size of the image data. Those cases include video data for a HDTV (High Definition Television) displayed on an ordinary television monitor, and a PC (personal computer) monitor.

Generally, in those cases, the image data is completely decoded, and then, the data size is reduced at the time the image data is displayed. When reducing the data size, details (high frequency components) of the image are lost. Therefore, by previously cutting the high frequency components and then decoding the image data together with reducing the data size, reproducing performance is improved. In a case where image data is decoded by software on a PC, even if decoding and reproducing are performed on a low-performance CPU, load imposed on the CPU while decoding can be reduced if decoding is performed while reducing the resolution.

"Scalable decoder without low-frequency drift" by Iwahashi, Kanbayashi, and Takaie (Technical Report of IEICE, DSP94-108, 1995.1) proposes a decoder which reduces the resolution during decoding, and thus outputs an image whose size is reduced, as described above. FIG. 6 is a block diagram showing the structure of the decoder of this proposal. When decoding compressed image data, the 4×4 IDCT (Inverse Discrete Cosine Transform) process unit 623 of this decoder reduces the resolution by performing 4×4 IDCT using only low frequency components among DCT blocks. The motion compensation process unit 625 reduces the values of a decoded motion vector to half, and performs motion compensation with ¼ pixel precision.

However, according to this decoding method, field information of each line of the image is lost by reducing the size in a vertical direction. Thus, there arises a problem that field prediction of the motion compensation employed in MPEG 2, etc. cannot be performed properly.

To overcome this problem, Unexamined Japanese Patent Application KOKAI Publication No. 2000-59793 discloses a method of switching IDCT methods between a field DCT mode and a frame DCT mode. According to this method, when the mode is switched to the frame DCT mode which applies DCT to the top field and to the bottom field together, image data which is obtained by performing IDCT is once divided into two fields, and field DCT is applied to the respective fields. And by performing IDCT using only low frequency components, size reduction is performed while keeping field information.

However, this method includes many calculations, thus is not suitable for processes that require high process performance, such as a decoding process performed by software on a PC. And this method is completely unsuitable in a case where display resolution is reduced with a view to improving reproducing performance.

Unexamined Japanese Patent Application KOKAI Publication No. 2000-175195 discloses a technique by which, when the mode is set to the frame DCT mode, IDCT is applied to all coefficients of DCT blocks, and DCT is applied to respective two pixel blocks which have been separated. However, this technique cannot solve the problem of increase in calculations, either. Further, as another example of a known art, Unexamined Japanese Patent Application KOKAI Publication No. 2000-244917 discloses a technique for providing an image decoder and an image decoding method which simplify the decoding process using a simple structure at the time of motion compensation. Unexamined Japanese Patent Application KOKAI Publication No. 2000-350207 discloses a technique for applying a transformation kernel including less calculations to an up sampling and down sampling procedures by employing generalized orthogonal transformation. Further, Unexamined Japanese Patent Application KOKAI Publication No. H10-191338 discloses a technique relating to a single coding apparatus capable of compressing an image effectively regardless of whether the image is a natural image or an artificial image.

SUMMARY OF THE INVENTION

The present invention was invented in view of the above problems, and it is an object of the present invention provides an image decoder and an image decoding method capable of preventing occurrence of distortion that may occur when decoding an image coded by an image coding method employing discrete cosine transform (DCT) such as MPEG 2, while reducing display resolution.

Also, the present invention provides an image decoder and an image decoding method capable of performing a process for reducing resolution (downscale decoding process) at high speed.

Thus, the present invention according to a first aspect provides an image decoder which applies a decoding process to image data comprising:

means for applying a variable length decoding process to a first image data; means for applying an inverse quantizing process to a first image data; means for determining a mode of discrete cosine transform of a first image data; inverse discrete cosine transform means for obtaining a second image; and wherein a inverse discrete cosine transform means transform a first image data into a second image having a lower degree than a first image data when a mode is a field mode which performs a discrete cosine transform by each field, and transform a first image data into a second image with keeping field information when a mode is a frame mode which performs a discrete cosine transform by each frame.

The inverse discrete cosine transform in case of the frame mode may preferably be a transform process equal to a process for performing full scale inverse discrete cosine transform in a vertical direction and thinning out image data by taking an average value of two lines arranged at every other line with respect to each other.

Further, the average value may preferably be derived by performing calculation of the inverse discrete cosine transform using a new basis function different from a basis function of the discrete cosine transform.

The present invention according to a second aspect provides an image decoding method for obtaining image data, comprising the following steps: applying a variable length decoding process to image data having first resolution; applying an inverse quantizing process to image data; determining a mode of discrete cosine transform of image data; obtaining image data having second resolution having an lower degree than image data having first resolution when a mode is a field mode which performs a discrete cosine transform by each field; and obtaining image data having second resolution by applying inverse discrete cosine transform to image data which has been subjected to an inverse quantizing process while keeping field information when a mode is a frame mode which performs a discrete cosine transform by each frame.

The inverse discrete cosine transform in case of the frame mode may preferably be a transform process equal to a process for performing full scale inverse discrete cosine transform in a vertical direction and thinning out image data by taking an average value of two lines arranged at every other line with respect to each other.

Further, the average value may preferably be derived by performing calculation of the inverse discrete cosine transform by changing a first basis function which is used when the discrete cosine transform is performed to a second basis function.

The present invention according to a second aspect provides an image decoder which applies a decoding process to image data comprising:

a first image data transformed into a second image data through a variable length decoding process, an inverse quantizing process, a discrete cosine transform mode selection process and an inverse discrete cosine transform process; and wherein a second image data transformed a lower resolution data than a first image data when a discrete cosine process is performed by each field and, a second image data having a same resolution with a first image data when a discrete cosine process is performed by each frame.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
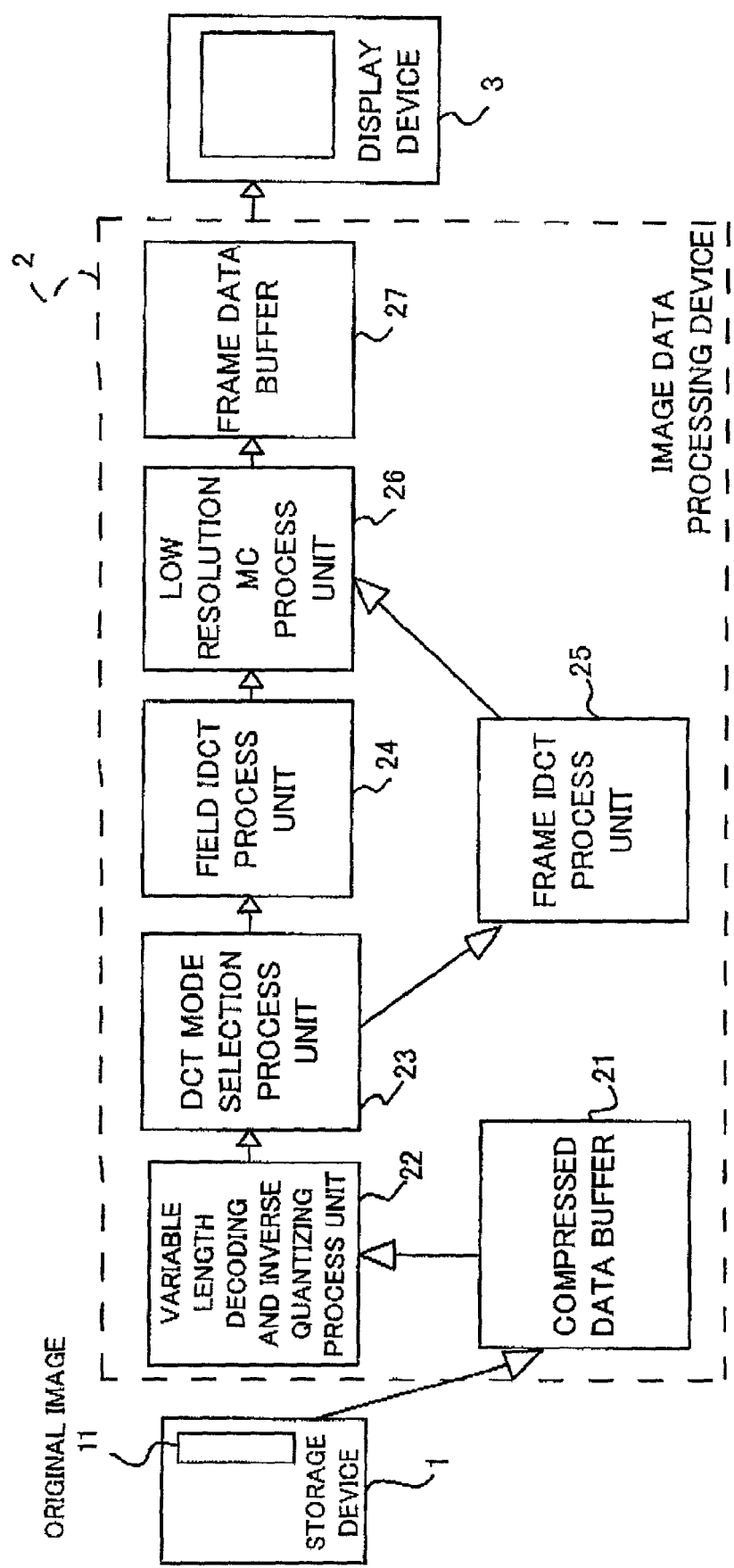
FIG. 1 is a block diagram showing the structure of an image processing apparatus according to an embodiment of the present invention.

We explain that an embodiment of the present invention with reference to the attached drawings. FIG. 1 is a block diagram showing the structure of an image processing apparatus according to this embodiment. In the image processing apparatus shown in FIG. 1, a storage device 1 stores an original image 11 which is compressed. An image data processing device 2 decodes image data loaded from the storage device 1, and sends the decoded image data to a display device 3.

As described above, in case of applying a decoding process to a coded image while reducing resolution (i.e., applying a downscale decoding), if inverse discrete cosine transform (IDCT) of low degree is applied to the vertical direction of the image, field information is lost. Accordingly, field prediction of motion compensation employed in the coding method cannot be properly performed.

Therefore, the image processing apparatus of this embodiment applies DCT of low degree while keeping field information, in a frame DCT mode employed in a coding method.

In order to achieve this, the image processing apparatus of this embodiment shown in FIG. 1 comprises the storage device 1 which stores coded image data, the image data processing device 2 which moves in accordance with a control of a program, and the display device 3 which displays the image data.

More specifically, the storage device 1 stores the original image 11 which is coded by a coding method which supports interlaced scanning such as MPEG 2. The image data processing device 2 comprises a compressed data buffer 21, a variable length decoding and inverse quantizing process unit 22, a DCT mode selection process unit 23, a field IDCT process unit 24, a frame IDCT process unit 25, a low resolution MC process unit 26, and a frame data buffer 27. The compressed data buffer 21 retains image data loaded from the storage device 1. The variable length decoding and inverse quantizing process unit 22 performs a variable length decoding and inverse quantizing process which is the first step of a decoding process. The DCT mode selection process unit 23 makes selection about a DCT mode. The field IDCT process unit 24 performs IDCT when the mode is set to the field DCT mode. The frame IDCT process unit 25 performs IDCT when the mode is set to the frame DCT mode. The low resolution MC process unit 26 performs motion compensation in a state of a reduced resolution. The frame data buffer 27 stores image data to be displayed.

Image data decoded by the image data processing device 2 having the above described structure is displayed by the display device 3.

An operation of the image processing apparatus according to this embodiment will now be specifically explained. As described above, the storage device 1 of the image processing apparatus according to this embodiment stores the original image 11 coded by a coding method which supports interlaced scanning such as MPEG 2. In order to decode the original image 11, the image processing apparatus loads the image data to the compressed data buffer 21 first.

In this embodiment, the original image 11 is coded by a coding method supporting interlaced scanning, such as MPEG 2. The decoding process includes variable length decoding, inverse quantization, inverse discrete cosine transform, and motion compensation.

As a first step of decoding, the variable length decoding and inverse quantizing process unit 22 applies variable length decoding and inverse quantization to the data of the original image 11. The data to be inverse-quantized has been coded by discrete cosine transform by each 8×8 pixel block.

Figure 2:
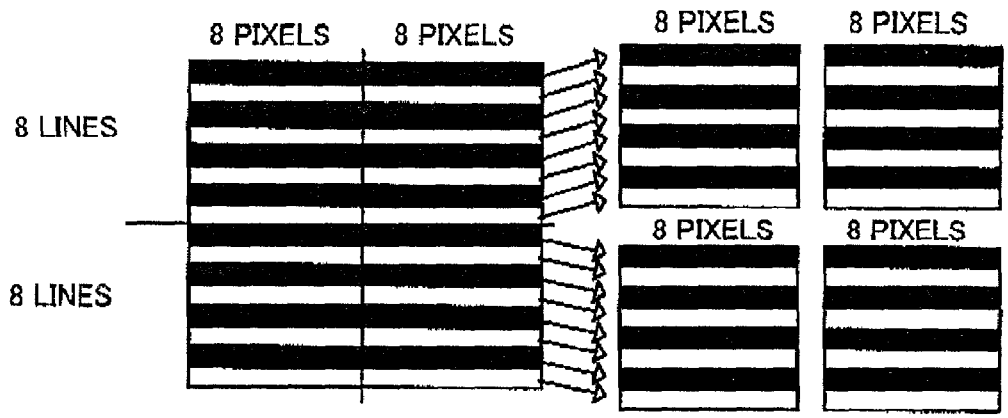
FIG. 2 is a diagram for explaining a frame DCT mode.
Figure 3:
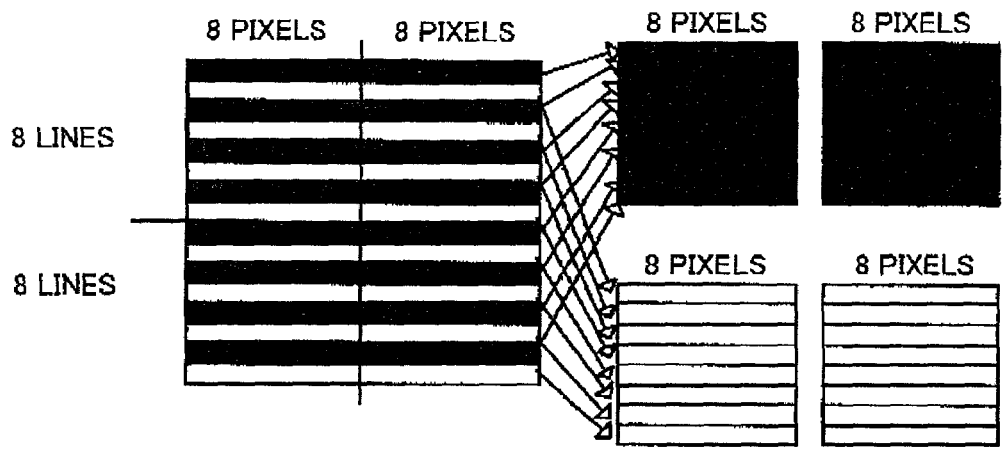
FIG. 3 is a diagram for explaining a field DCT mode.

FIG. 2 schematically shows a discrete cosine transform scheme using 8×8 pixels, This scheme is called a frame DCT mode. FIG. 3 schematically shows a discrete cosine transform scheme in which DCT is performed by rearranging lines by every other line (by rearranging lines into fields). This scheme is called a field DCT mode. Those two modes are actually employed in MPEG2, etc.

In order to reduce resolution of the image at the time of decoding, inverse discrete cosine transform of lower degree than that of 8×8 discrete cosine transform performed at the time of coding, is performed. For example, in order to reduce resolution to ½ in both vertical and horizontal directions, 4×4 inverse discrete cosine transform is performed. However, in case of the frame DCT mode, field information is lost after 4×4 inverse discrete cosine transform.

If field information is lost, motion compensation which is performed after inverse discrete cosine transform cannot be performed properly, and decoding cannot be completed properly. Therefore, the DCT mode selection process unit 23 detects the DCT mode, and performs different processes for the frame DCT mode and the field DCT mode. That is, in case of the field DCT mode, since data in each block is structured into each corresponding field, the field IDCT process unit 24 reduces the resolution by directly performing 4×4 inverse discrete cosine transform.

In case of the frame DCT mode, the horizontal direction resolution is reduced to half by simply performing 4 scale IDCT. However, if 4 scale IDCT is performed to reduce the resolution in the vertical direction, field information is lost, and thereby the image quality deteriorates. To avoid this, IDCT is performed as described below.

In order to reduce the resolution in the vertical direction while keeping field information, the simplest way is to perform full scale (8 scale) IDCT, and thin out the output data field by field.

Figure 4:
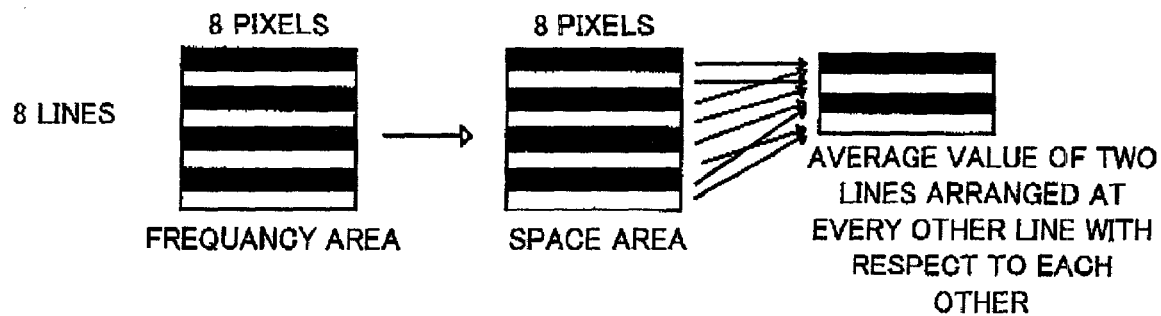
FIG. 4 is a diagram for explaining 8 scale IDCT in the vertical direction.

FIG. 4 explains a method by which data obtained by performing 8 scale IDCT in the vertical direction is thinned out by taking an average of two lines arranged at every other line with respect to each other. However, this method includes many processes because it performs 8 scale IDCT. And after IDCT, thinning out in the vertical direction is performed. This further increases processes included.

To solve this problem, calculation indicated below is performed in the present embodiment. That is, IDCT is defined as expression 1 below, in a case where output data is indicated by f(x), and DCT coefficient is indicated by F(x).

[EXPRESSION 1] (1)

$$f(x) = \frac{2}{N}\sum_{u=0}^{Nl} C(u)F(u)\cos\frac{(2x+1)u\pi}{2N}$$

where

[EXPRESSION 2] (2)

$$C(u) = \begin{cases} \frac{1}{\sqrt{2}} & (u = 0) \\ 1 & (u \neq 0) \end{cases}$$

An average value g(x) of two lines arranged at every other line which is used when thinning out the data in the vertical direction is indicated by

[EXPRESSION 3] (3)

$$g(x) = \frac{f(x) + f(x+2)}{2}$$

Therefore, g(x) can be expressed as indicated below from above expressions (1) and (3).

[EXPRESSION 4] (4)

$$\begin{aligned}g(x) &= \frac{f(x) + f(x+2)}{2} \\ &= \frac{1}{2}\left\{\frac{2}{N}\sum_{u=0}^{N-1} C(u)F(u)\cos\frac{(2x+1)u\pi}{2N} + \frac{2}{N}\sum_{u=0}^{N-1} C(u)F(u)\cos\frac{(2x+5)u\pi}{2N}\right\} \\ &= \frac{1}{N}\sum_{u=0}^{Nl} C(u)F(u)\left\{\cos\frac{(2x+1)u\pi}{2N} + \cos\frac{(2x+5)u\pi}{2N}\right\} \\ &= \frac{2}{N}\sum_{u=0}^{N-1} C(u)F(u)\cos\frac{(2x+3)u\pi}{2N}\cos\frac{u\pi}{N}\end{aligned}$$

In this case, by defining the basis function of the IDCT calculation not as

[EXPRESSION 5] (5)

$$\cos\frac{(2x+1)u\pi}{2N}$$

but as

[EXPRESSION 6] (6)

$$\cos\frac{(2x+3)u\pi}{2N}\cos\frac{u\pi}{N},$$

the output of the IDCT calculation automatically equals an average value g(x) of two lines arranged at every other line.

In a case where the IDCT calculation is performed by software, since the value of the basis function is pre-stored in a memory, the number of calculations is not changed due to the change of basis functions. Therefore, average values can be obtained with the same number of calculations as a normal IDCT.

Since only g(0), g(1), g(4), and g(5) are necessary as data for performing the process of reducing the resolution, only those four values need to be calculated. With those calculations, a process that is equal to performing full scale IDCT in the vertical direction and thinning out the resultant data with average values of two lines arranged at every other line can be performed quickly.

According to the present embodiment, decoding is performed by reducing resolution to half in both vertical and horizontal directions while keeping field information, as described above. Motion compensation is performed by the low resolution MC process unit 26 shown in FIG. 1. Specifically, motion compensation is performed with ¼ pixel precision by reducing the motion vector to half. The result of decoding is stored in the frame data buffer 27, and then displayed by the display device 3.

Figure 5:
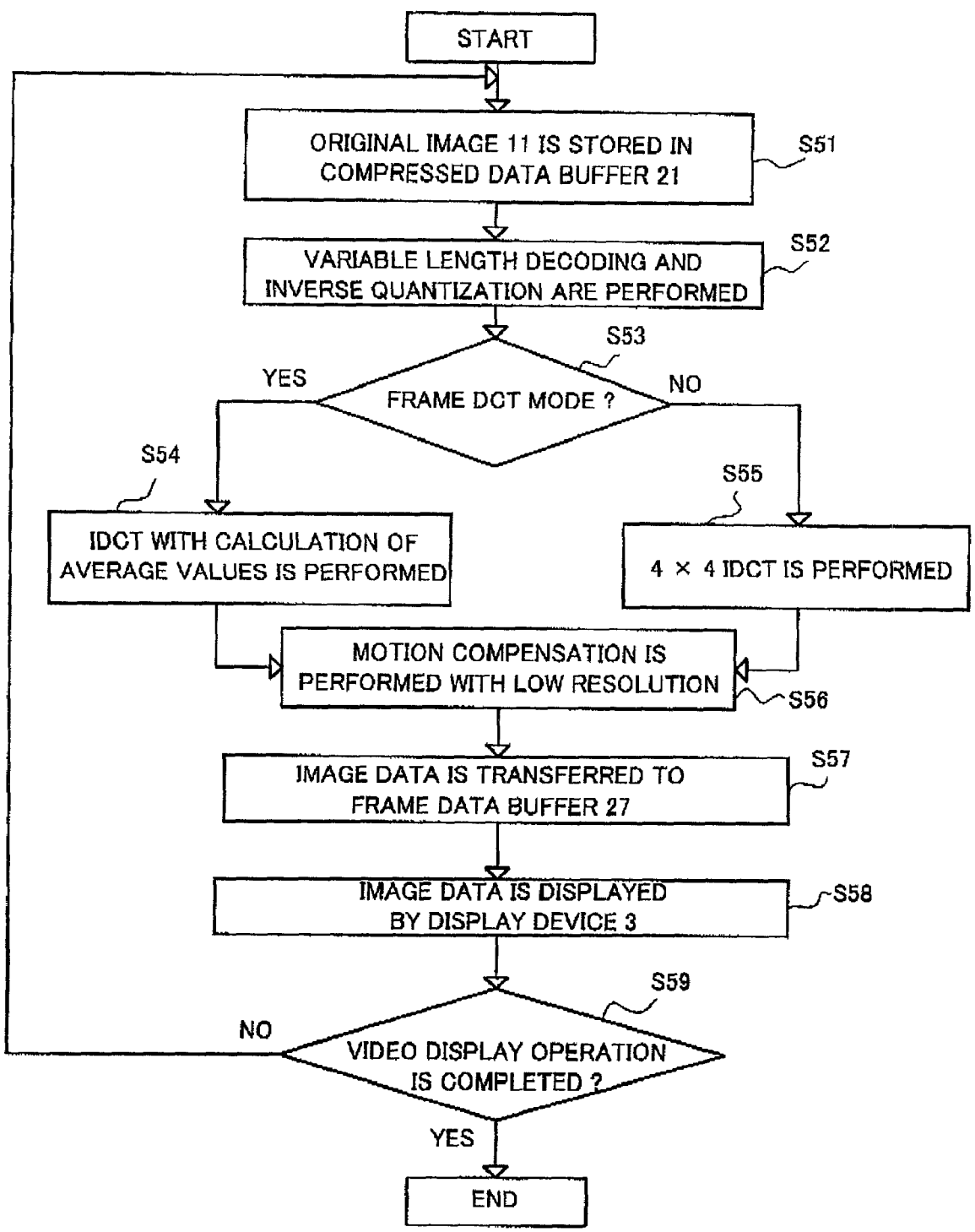
FIG. 5 is a flowchart showing the flow of a moving picture reproducing process performed by the image processing apparatus according to the embodiment.
Figure 6:
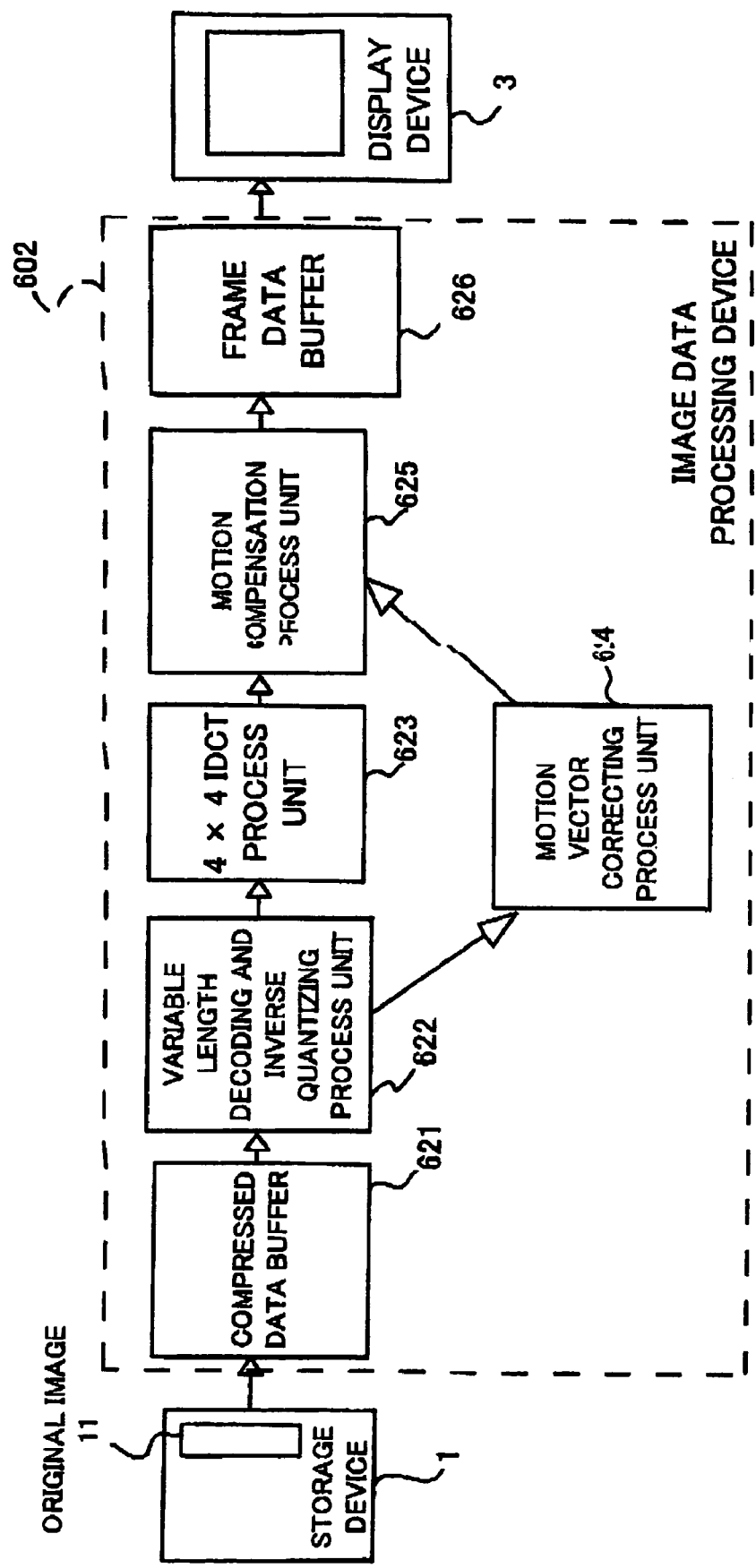
FIG. 6 is a diagram showing the structure of a conventional decoder which reduces resolution during decoding, and outputs an image whose size is reduced.

FIG. 5 is a flowchart showing the flow of a moving picture reproducing process performed by the image processing apparatus according to this embodiment. When the decoding process is started, the original image 11 is transferred to the compressed data buffer 21 in the image processing apparatus in step S51. Then, the variable length decoding and inverse quantizing process unit 22 performs variable length decoding and inverse quantization (step S52).

In step S53, the DCT mode selection process unit 23 checks the DCT mode. In a case where the mode is the field DCT mode, the field IDCT process unit 24 performs 4×4 inverse discrete cosine transform (step S55). Then, the flow goes to step S56.

In a case where the mode is the frame DCT mode, the frame IDCT process unit 25 performs inverse discrete cosine transform with calculation of average values in step S54. Then, the flow goes to step S56.

In step S56, the low resolution MC process unit 26 performs motion compensation with the low (reduced) resolution which has been obtained in the former step. Then, in step S57, the image data which has been decoded completely is stored in the frame data buffer 27. Thus decoded image data is displayed by the display device 3 in step S58.

In step S59, whether the video display operation is completed or not is determined. In a case where it is determined that the video display operation is not completed, the flow returns to step S51, and decoding of the next image data is started. However, in a case where it is determined that the video display operation is completed, the moving picture reproducing process is terminated.

As explained above, according to the present embodiment, in a case where the mode is the field DCT mode, a normal process for reducing the resolution is performed. In a case where the mode is the frame DCT mode, inverse discrete cosine transform is performed by changing the basis function of DCT, so that data of each field is output in a thinned out state. Such calculation eliminates the need for thinning out image data in the vertical direction after performing full scale IDCT. Thus, number of processes included can be reduced securely.

In other words, by performing different processes in accordance with the DCT modes to perform the process for reducing the resolution while keeping interlace information, a complicated process for reducing the resolution becomes unnecessary, and a downscale decoding process without deterioration of image quality can be realized. This method is effective especially in a case where decoding is performed by software, since this method enables decoding without need for a complicated process.

And by performing IDCT by changing the basis functions, calculation of average values required when thinning out image data can be skipped. Therefore, the downscale decoding process can be performed at high speed.

According to the present invention, variable length decoding is applied to image data having first resolution. Then, inverse quantization is applied to the image data which has been variable-length decoded. Thereafter, the mode of discrete cosine transform of the image data before being decoded (i.e., compressed image data) is determined. In accordance with the determined mode, inverse discrete cosine transform of lower degree than that of discrete cosine transform is applied to the image data after inverse quantization, so that image data having second resolution can be obtained. In a case where the mode is a field mode which performs discrete cosine transform by each field, inverse discrete cosine transform of the above-described degree is performed. In a case where the mode is a frame mode which performs discrete cosine transform by each frame, inverse discrete cosine transform is performed while keeping field information. Due to this, a thinning out process in the vertical direction becomes unnecessary, and a complicated process for reducing the resolution also becomes unnecessary.

Therefore, according to the present invention, it is possible to provide an image decoder and an image decoding method which can realize a downscale decoding process without causing deterioration of image quality.

Further, according to the present invention, it is possible to skip calculation of average values which is required when thinning out image data and thus to realize a downscale decoding process at high speed, by performing calculation of inverse discrete cosine transform using a basis function different from the basis function of discrete cosine transform, that is, by performing IDCT by changing basis functions.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-107329 filed on Apr. 5, 2001 and including specification, claims, drawings and summary. The disclosure of the above Japanese Patent Application is incorporated herein by reference in its entirety.

What is claimed is:

1. An image decoder which applies a decoding process to image data, said image decoder comprising:
    means for applying a variable length decoding process to a first image data;
    means for applying an inverse quantizing process to said first image data;
    means for determining a mode of discrete cosine transform of said first image data; and
    inverse discrete cosine transform means for obtaining a second image,
    wherein:
        said inverse discrete cosine transform means transforms said first image data into said second image having a lower degree than said first image data when said mode comprises a field mode which performs said discrete cosine transform by each field, using a first mathematical expression as a first basis function,
        said inverse discrete cosine transform means transforms said first image data into said second image having said lower degree with keeping field information when said mode comprises a frame mode which performs said discrete cosine transform by each frame, using a second mathematical expression as a second basis function, such that a number of calculations included in said inverse discrete cosine transform using said second basis function is substantially equal to a number of calculations included in said inverse discrete cosine transform using said first basis function, and said first basis function comprises cos [(2x +1)uπ/2N] and said second basis function comprises cos [(2x+3)uπ/2N] cos[uπ/N].

2. An image decoding method for obtaining image data, comprising:
applying a variable length decoding process to image data having a first resolution;
applying an inverse quantizing process to said image data;
determining a mode of discrete cosine transform of said image data;
obtaining image data having a second resolution having a lower degree than said image data having first resolution, when said mode comprises a field mode, which performs said discrete cosine transform by each field; and
obtaining image data having said second resolution by applying inverse discrete cosine transform to said image data which has been subjected to said inverse quantizing process while keeping field information, when said mode comprises a frame mode, which performs said discrete cosine transform by each frame, wherein
processing said inverse discrete cosine transform uses a first mathematical expression as a first basis function for said field mode and a second mathematical expression as a second basis function for said frame mode such that a number of calculations included in processing said inverse discrete cosine transform using said second basis function is substantially equal to a number of calculations included in said inverse discrete cosine transform using said first basis function, and said first basis function comprises cos [(2x+1)uπ2N] and said second basis function comprises cos [(2x+3)uπ/2N] cos[uπ/N].

3. An image decoder which applies a decoding process to image data comprising:
a first image data transformed into a second image data through a variable length decoding process;
an inverse quantizing process;
a discrete cosine transform mode selection process; and
an inverse discrete cosine transform process,
wherein:
said second image data is transformed to a lower resolution data than said first image data when a discrete cosine process is performed by each field;
said second image data has a same resolution with said first image data when said discrete cosine process is performed by each frame; and
a first mathematical expression is used as a first basis function for calculations of said field mode and a second mathematical expression is used as a second basis function for calculations of said frame mode such that a number of calculations included in processing said inverse discrete cosine transform using said second basis function is substantially equal to a number of calculations included in processing said inverse discrete cosine transform using said first basis function; and
said first basis function comprises cos [(2x+1)uπ/2N]) and said second basis function comprises cos [(2x+3)uπ/2N]cos[uπ/N].

4. A method of image decoding, comprising:
receiving an image data;
determining a mode of discrete cosine transform of said image data as being one of a field mode and a frame mode; and
applying an inverse discrete cosine transform to said data,
wherein said inverse discrete cosine transform uses a first mathematical expression for a first basis function for said field mode and a second mathematical expression for a second basis function for said frame mode such that a number of calculations included in said inverse discrete cosine transform using said second basis function is substantially equal to a number of calculations included in said inverse discrete cosine transform using said first basis function and a same reduction in resolution is achieved in each of said field mode and said frame mode, and
wherein said first basis function comprises cos [(2x+1) uπ/2N] and, said second basis function comprises cos [(2x+3)uπ/2N]cos[uπN].

* * * * *